Patented Sept. 1, 1936

2,052,833

UNITED STATES PATENT OFFICE

2,052,833

PROCESS OF PREPARING METALLIFEROUS HYDROXYQUINOLINE AZO DYESTUFFS

Hans Krzikalla and Walter Limbacher, Ludwigshafen-on-the-Rhine, Germany, assignors to General Aniline Works, Inc., New York, N. Y., a corporation of Delaware No Drawing. Application February 25, 1935, Serial No. 8,209. In Germany March 7, 1934

3 Claims. (Cl. 260—12)

The present invention relates to azo dyestuffs containing metal and a process of producing same.

We have found that valuable azo dyestuffs containing metal are obtained by first treating 8-hydroxyquinoline or its derivatives, for example 8-hydroxyquinoline-5-sulphonic acid, 2-methyl-8-hydroxyquinoline, 5-chlor-8-hydroxyquinoline or 5-methyl-8-hydroxyquinoline, with agents supplying metal, the resulting products being converted into azo dyestuffs containing metal by subsequent coupling with diazo compounds free from groups capable of forming complex metal compounds the components being so selected that the dyestuffs contain at least one acid group.

It is already known to produce azo dyestuffs containing metal by treating azo dyestuffs containing at least one acid group and derived from 8-hydroxyquinoline or its derivatives with agents supplying metal. In contrast to this process the present invention offers the great advantage of carrying out the production of the complex metal compounds of 8-hydroxyquinoline or its derivatives on a large scale and coupling the said complex metal compounds in a second stage with any desired diazo compound. By reason of this fact it is not necessary to make experiments in order to find out in each case the best conditions for converting the unmetallized azo dyestuffs into complex metal compounds.

The following examples will further illustrate the nature of this invention but the invention is not restricted to these examples. The parts are by weight.

Example 1

The complex chromium compound of 8-hydroxyquinoline, which is obtainable by boiling a hydrochloric acid solution of 15.2 parts of 8-hydroxyquinoline for a short time with a solution of chromium formate, is coupled with the diazo compound of 17.3 parts of metanilic acid in a solution rendered alkaline with sodium carbonate. When the formation of dyestuff is completed, the product is salted out and worked up in the usual manner. The resulting chromium compound of the dyestuff dyes leather beautiful yellow-brown shades having a very good fastness to light. It yields on wool orange shades having a very good fastness to washing and fulling.

Instead of chromium formate, other chromium salts such as chromium fluoride, acetate or sulphate may be employed. Similarly dyestuffs containing other metals, as for example iron, may be prepared, for example by boiling a hydrochloric acid solution of 8-hydroxyquinoline with the appropriate amount of ferric acetate and subsequently coupling with a diazo compound. Dyestuffs of the said kind are especially suitable for dyeing leather.

Example 2

The complex chromium compound of 8-hydroxyquinoline-5-sulphonic acid, which is obtainable by boiling a neutral solution of 23.6 parts of 8-hydroxyquinoline-5-sulphonic acid for a short time with a solution of chromium formate, is coupled with the diazo compound of 13.8 parts of para-nitraniline in a solution rendered acid with acetic acid. The product is worked up in the usual manner. The dyestuff dyes wool yellow-red shades having very good properties as regards fastness.

What we claim is:—

1. The process for the production of azo dyestuffs containing metal which comprises reacting a compound selected from the group consisting of 8-hydroxyquinoline, 8-hydroxyquinoline-5-sulphonic acid, 2-methyl-8-hydroxyquinoline, 5-chlor-8-hydroxyquinoline and 5-methyl-8-hydroxyquinoline with agents supplying metal and coupling the resulting metal compounds with aromatic diazo compounds free from groups capable of forming complex metal compounds, the components being so selected that the dyestuffs contain at least one acid group.

2. The process for the production of azo dyestuffs containing chromium which comprises reacting a compound selected from the group consisting of 8-hydroxyquinoline, 8-hydroxyquinoline-5-sulphonic acid, 2-methyl-8-hydroxyquinoline, 5-chlor-8-hydroxyquinoline and 5-methyl-8-hydroxyquinoline with agents supplying chromium and coupling the resulting chromium compounds with aromatic diazo compounds free from groups capable of forming complex metal compounds, the components being so selected that the dyestuffs contain at least one acid group.

3. The process for the production of azo dyestuffs containing iron which comprises reacting a compound selected from the group consisting of 8-hydroxyquinoline, 8-hydroxyquinoline-5-sulphonic acid, 2-methyl-8-hydroxyquinoline, 5-chlor-8-hydroxyquinoline and 5-methyl-8-hydroxyquinoline with agents supplying iron and coupling the resulting iron compounds with aromatic diazo compounds free from groups capable of forming complex metal compounds, the components being so selected that the dyestuffs contain at least one acid group.

HANS KRZIKALLA.
WALTER LIMBACHER.